Jan. 10, 1928.
R. E. HELLMUND
1,655,952
SYSTEM AND METHOD OF COMMUTATION FOR FREQUENCY CHANGERS
Filed April 18, 1922    6 Sheets-Sheet 4
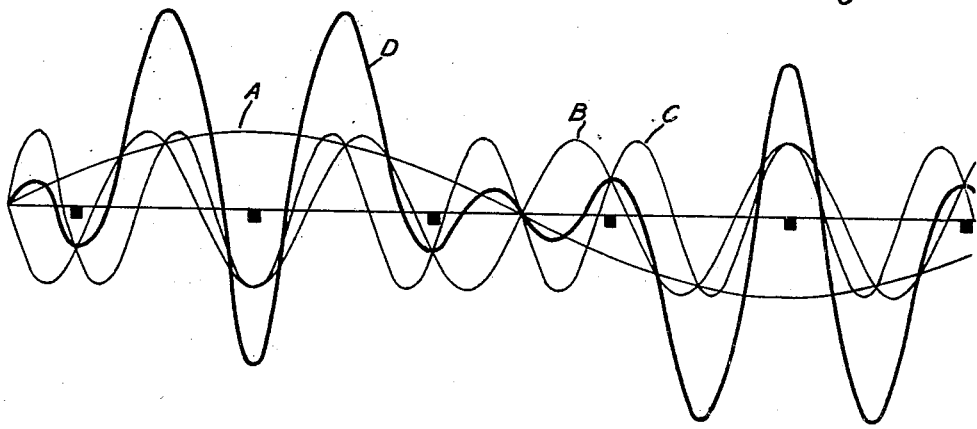
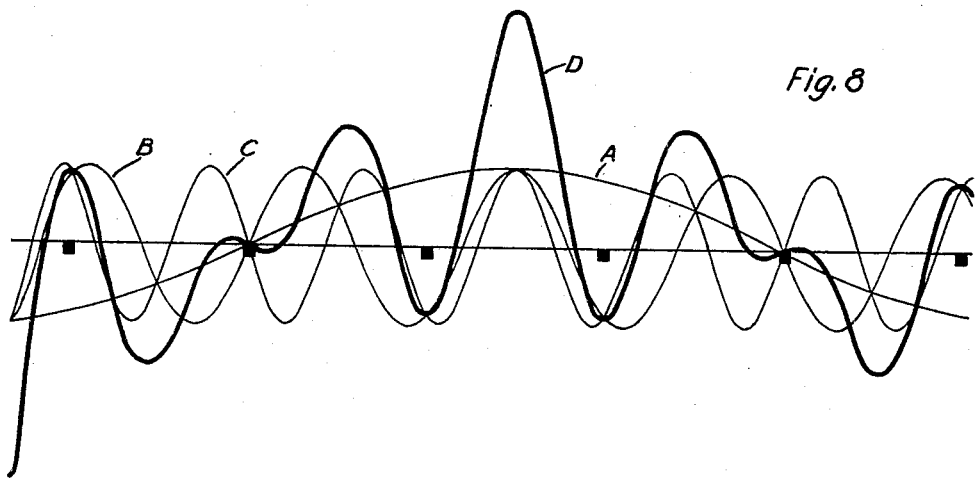
WITNESSES:
INVENTOR
Rudolf E. Hellmund
BY
ATTORNEY Jan. 10, 1928.  
R. E. HELLMUND  
1,655,952  
SYSTEM AND METHOD OF COMMUTATION FOR FREQUENCY CHANGERS  
Filed April 18, 1922  6 Sheets-Sheet 6

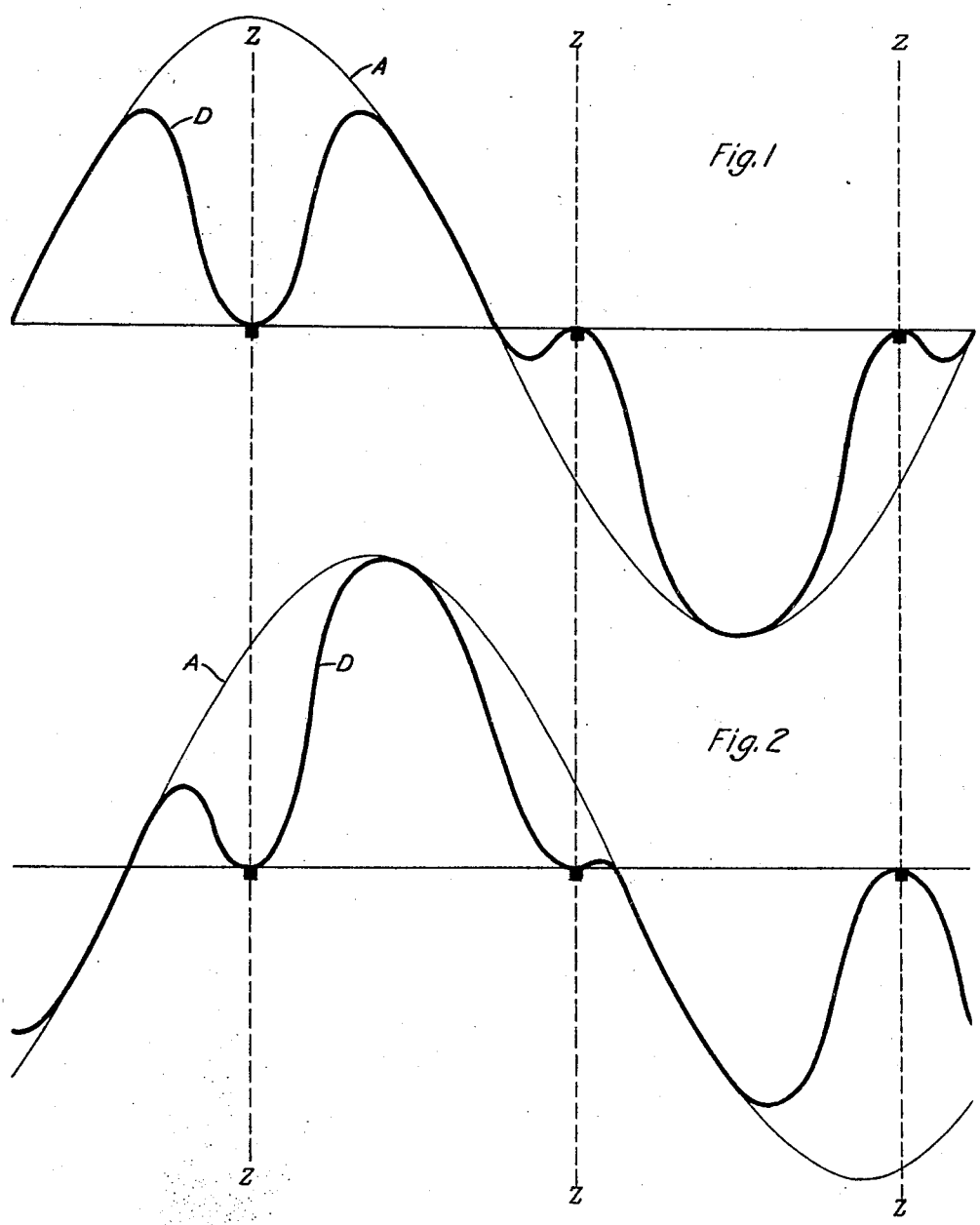

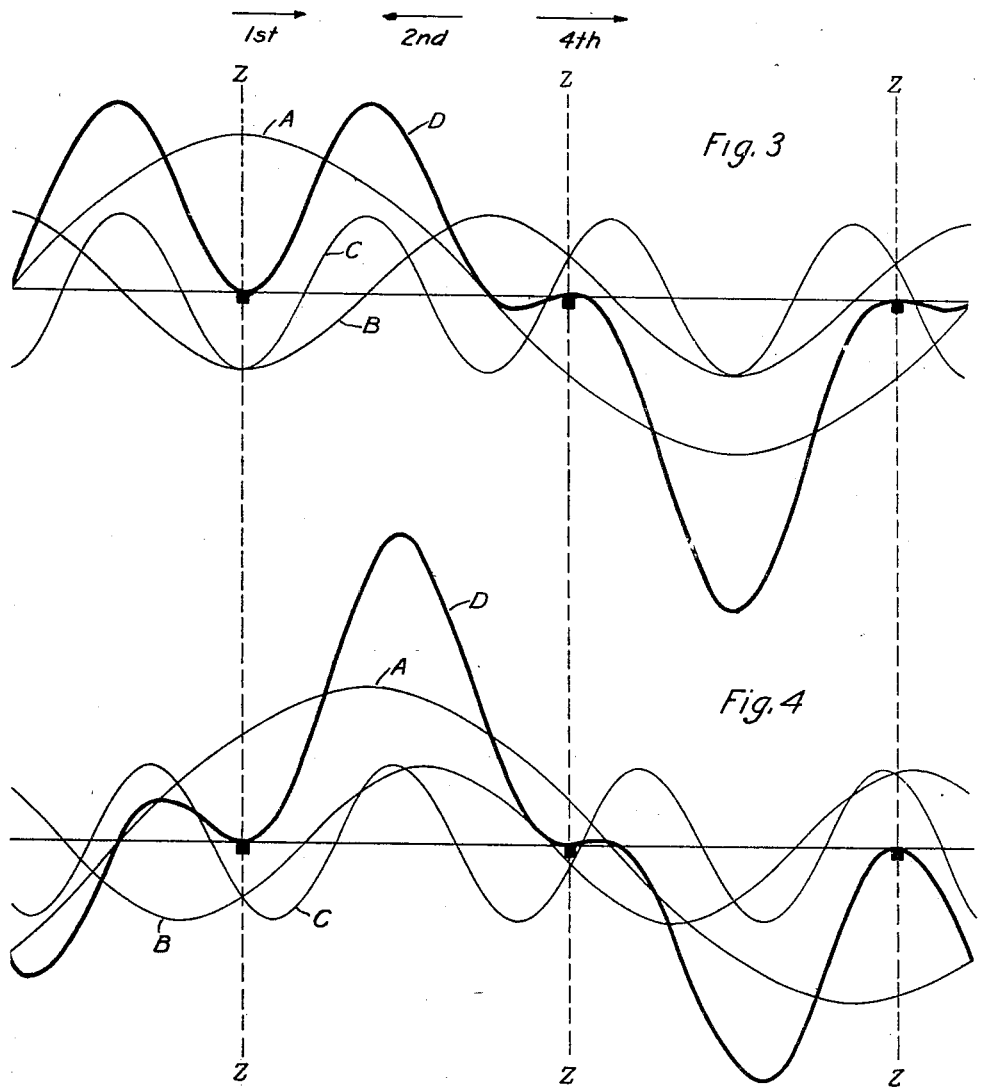

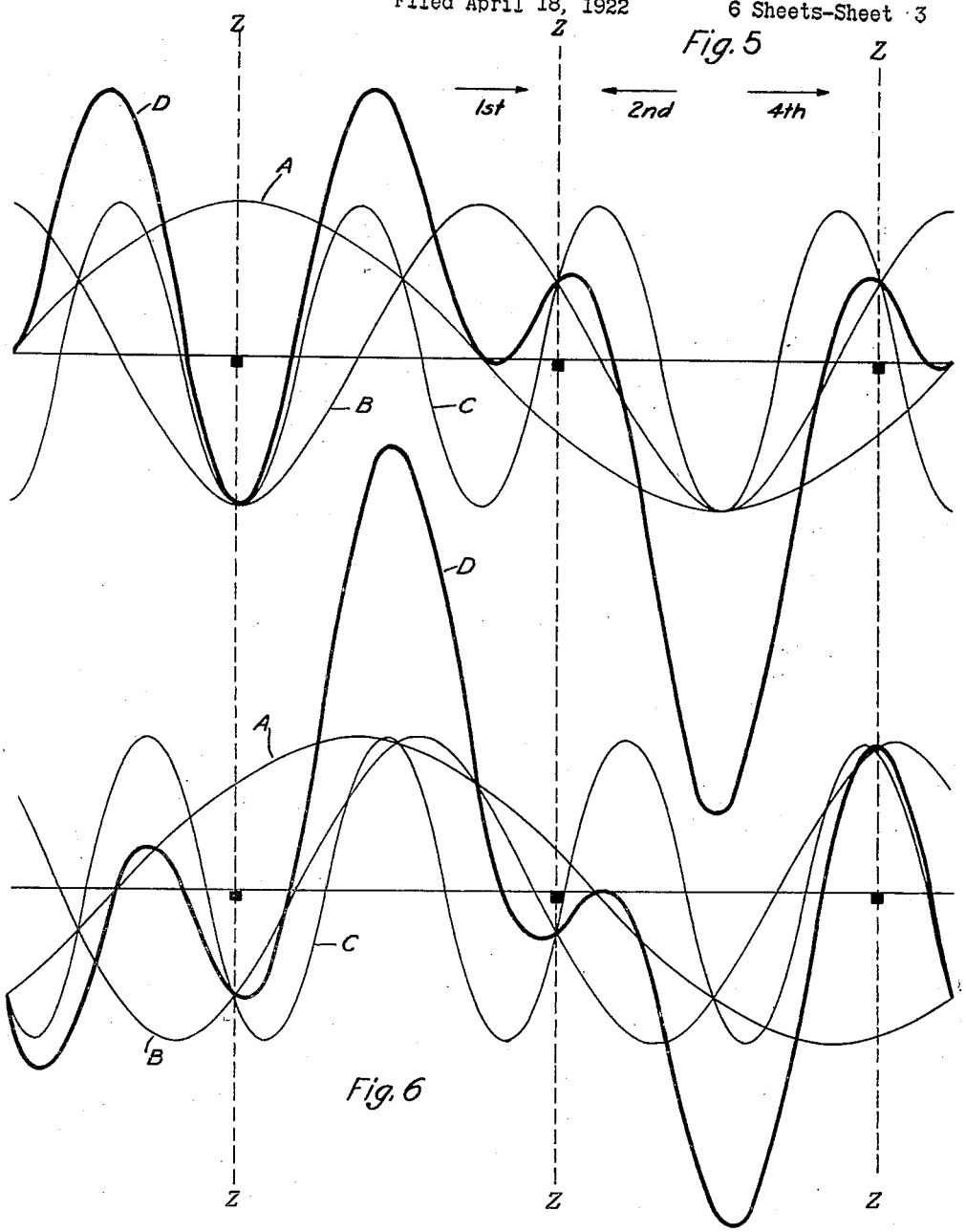

WITNESSES:

INVENTOR  
Rudolf E. Hellmund  
BY  
ATTORNEY

Patented Jan. 10, 1928.

1,655,952

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM AND METHOD OF COMMUTATION FOR FREQUENCY CHANGERS.

Application filed April 18, 1922. Serial No. 555,515.

My invention relates to alternating-current commutator machines and it has particular reference to a system for improving the commutation of frequency changers.

An object of my invention is to provide a frequency changer or other alternating-current commutator machine with a stator member carrying windings producing higher harmonics in the field, whereby the armature field may be overcome or reversed in the commutating zones.

Another object of my invention is to provide a machine of the above designated character with a plurality of field windings having different pole numbers, whereby the wave-form or distribution of the field may be controlled.

With these and other objects in view, my invention consists in the methods and apparatus disclosed in the following description and illustrated in the accompanying drawing, wherein Figures 1 to 10 are flux distribution diagrams which will be referred to in the detail description of the invention.

Figure 11:
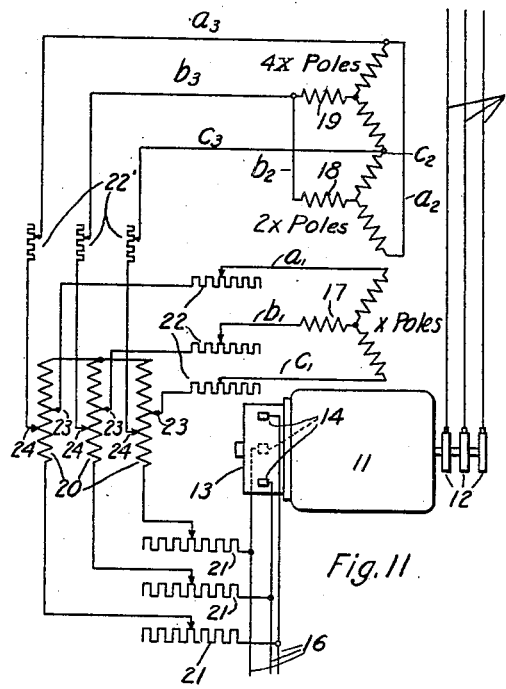
Figure 12:
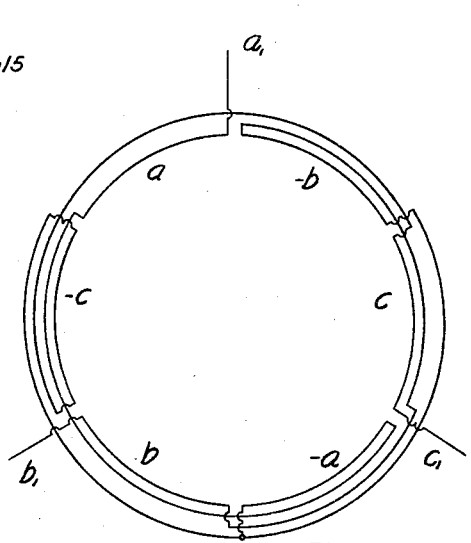
Figure 13:
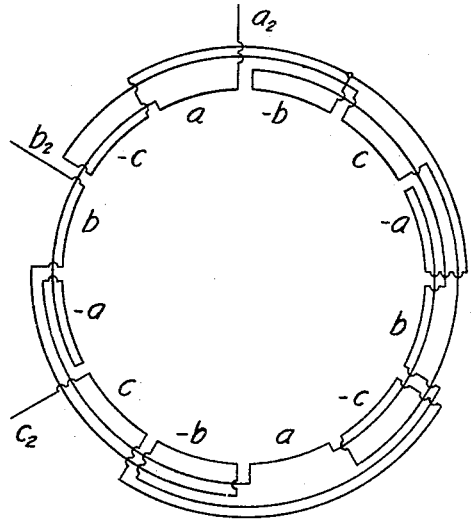
Figure 14:
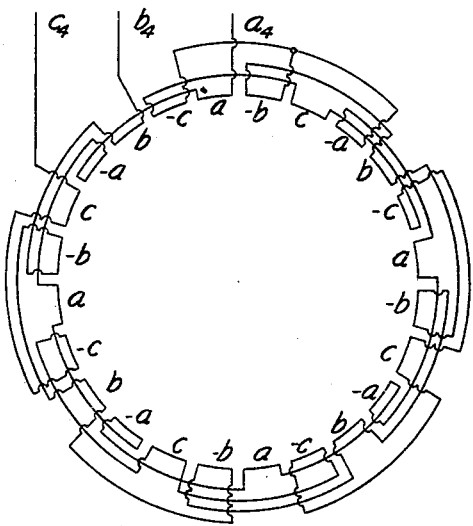

Fig. 11 is a diagrammatic view of a frequency changer embodying my invention, and Figs. 12, 13 and 14 are detail views illustrating winding diagrams of the respective field-magnet windings of the frequency changer shown in Fig. 11.

In frequency changers of the type having an armature member provided with slip-rings and a commutator, it is very difficult to overcome sparking at the brushes. We may consider the sparking voltage as being induced by an armature flux rotating with the synchronous speed of the slip-ring frequency relative to the armature or, what amounts to the same thing, it may be considered as being induced by a stator flux having the slip frequency or commutator-brush frequency. In analyzing the effect of the stator flux upon the coils undergoing commutation, the sparking voltage is best considered as consisting of two components, one due to the transformer action of the flux and one induced by rotation.

The two components have to be added arithmetically and, therefore, it is desirable to reduce both of them as much as possible. The transformer voltage, however, cannot be reduced without reducing the useful voltage of the machine. The rotational sparking voltage may, however, be practically eliminated by providing interpolar spaces or notches in the stator opposite to the commutator zone of the armature.

Curve A of Fig. 1 illustrates the flux distribution of a three-phase armature with a coil throw of 120 electrical degrees producing three commutating zones which are 120° apart, as indicated by the dotted lines Z—Z. If the stator is notched at these zones, the field form changes and gives merely zero flux-density at the center of the zones, as indicated by the heavy curve D.

Fig. 2 shows the flux distribution an eighth of a cycle later than Fig. 1. An inspection of the curves D in Figs. 1 and 2 indicates the presence of the second and fourth harmonics. The same result in the field form may, therefore, be obtained by omitting the stator notches and by introducing, in their place, windings producing the above harmonics.

In Fig. 3 is shown a fundamental sine wave A, a second harmonic wave B and a fourth harmonic wave C. By combining the three curves, we obtain a resultant curve D which is similar to the wave shape of Fig. 1.

In Fig. 4, the fundamental wave is shifted an eighth of a cycle to the right, the second harmonic B an eighth of a cycle to the left and the fourth harmonic C an eighth of a cycle to the right. The resultant wave D is similar to the curve of Fig. 2. By considering further field positions, it may thus be shown that the field density in the commutating zones and, therefore, the rotational sparking voltage, may always be kept at zero by adding to the fundamental wave a second harmonic with opposite direction of rotation and a fourth harmonic rotating in the same direction as the commutating field.

Since the reduction of the zone density to zero eliminates the positive rotational sparking voltage, it follows that a reversal of flux in the commutating zones introduces a negative rotational voltage which opposes the pulsating sparking voltage. We have thus a possibility of reducing the resultant sparking voltage to zero by properly adjusting the negative-field densities in the zones. This may readily be done by increasing the second and fourth harmonics a proper amount over the values assumed in Figs. 3 and 4. The change just mentioned has been embodied in Figs. 5 and 6 and it will be seen that the field density in the commutating zones is always opposite the polarity of the fundamental wave A, as found to be desirable.

With three-phase and six-phase full-pitch armatures, we obtain six commutating zones 60° apart. The desired results are obtained in this case by a fifth harmonic traveling in a direction opposite to the fundamental wave and a seventh harmonic traveling in the same direction as the fundamental wave. Such a case is demonstrated in Figs. 7 and 8.

Figure 9:
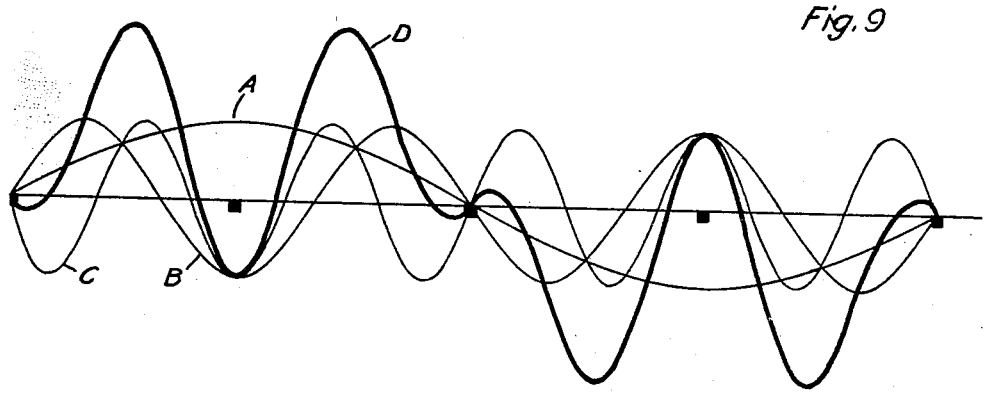
Figure 10:
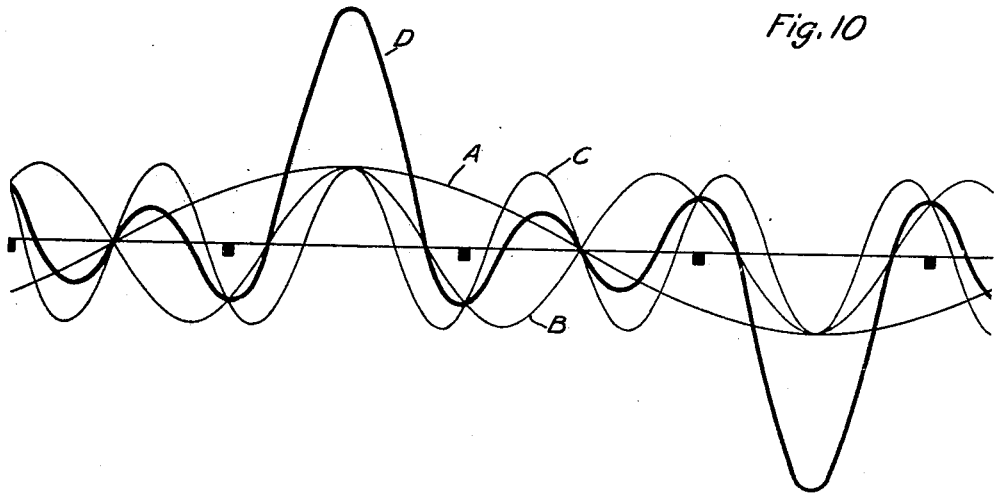

With two-phase full-pitch armatures, four commutating zones are obtained, and it is necessary to employ a third harmonic field and a fifth harmonic field, as shown in Figs. 9 and 10, in order to obtain the desired results.

In general, if N is the number of commutating zones per pole-pair, the armature field in the commutating zones may be overcome and reversed by a backwardly rotating harmonic field of the $N-1$ order and an equal forwardly rotating harmonic field of the $N+1$ order.

In Fig. 11 is shown a frequency converter having an armature member 11 provided with slip-rings 12 and a commutator cylinder 13. Three equally spaced brushes 14 are distributed about the commutator cylinder 13. The slip-rings 12 are connected to a supply circuit 15. A load circuit 16 of the slip frequency is connected to the brushes 14.

The frequency converter is provided with a stator member having a fundamental field winding 17 having X poles, where X is the number of poles of the armature number 11, a second-harmonic field winding 18 having 2X poles and a fourth-harmonic field winding 19 having 4X poles. Energy for exciting the field windings is provided by means of an auto-transformer 20 which is connected to the load circuit 16 through regulating resistors 21, whereby the relative phase-positions of the field winding fluxes may be adjusted with respect to the position of the brushes 14.

The fundamental field winding 17 is energized, through adjusting resistors 22, from taps 23 on the transformer 20. The second and fourth-harmonic field windings 18 and 19 are similarly energized, through adjusting resistors 22′, from taps 24 on the transformer. It will be noted that the second-harmonic winding is connected in opposite phase-sequence whereby a backwardly rotating second-harmonic field is produced.

In practice, it will not be necessary always to employ separate field windings. In Figs. 12, 13 and 14 are shown the field windings 17, 18 and 19, respectively, showing the arrangement of the conductors in the slots, and indicating the phases and current directions. It will be found that, in certain slots, the currents oppose each other so that the conductors can be omitted entirely without changing the effect. In other slots, it will be possible to replace currents of two different phases by conductors of the third phase. In this manner, it will be seen that it is possible to work out simplified windings giving the same effect as the separate windings 17, 18 and 19, provided the adjustable features afforded by the transformer taps and resistors 21, 22 and 22′ are dispensed with.

In its broadest aspect, therefore, my invention contemplates the employment of any form of field winding producing the harmonic field components hereinbefore described.

The adjustable features provided by the transformer taps and the phase-modifying means 21, 22 and 22′ in Fig. 11 are useful, however, in machines where the commutating conditions are variable, as where the brushes are shifted or where the mechanical load on the armature is varied through wide limits.

While I have described certain characteristics of my invention in detail, and while I have pointed out certain of the most obvious principles and purposes thereof, I do not intend that the language employed in the following claims shall be limited to the precise features described, but I intend that the claims shall be construed to cover all modifications which are fairly comprehended by the language thereof, when read in connection with the prior art, regardless of the details and functions mentioned in the description or illustrated in the drawing.

I claim as my invention:

1. A frequency changer comprising an armature member having slip-rings and a commutator, polyphase commutator brushes, a stator member carrying polyphase field windings producing rotating flux components of a plurality of pole numbers which are multiples of the fundamental pole number of the armature member and of such phase, magnitude and direction of rotation as to combine vectorially with the fundamental armature flux in the commutating zones to produce proper commutating conditions for said brushes.

2. A frequency changer comprising an armature member having slip-rings and a commutator, said armature having N commutating zones per pole-pair, where N is greater than two, and a stator member carrying windings producing a backwardly rotating harmonic field of the N−1 order and a forwardly rotating harmonic field of the N+1 order.

3. A frequency changer comprising an armature member having slip-rings and a commutator, polyphase commutator brushes, and a stator member having windings carrying currents of slip frequency and producing a predetermined field form having a plurality of pole numbers which are multiples of the fundamental pole number of the armature member and which have predetermined directions of rotation and relative phases and magnitudes, said field form being such as to produce proper commutating conditions for said brushes.

4. A frequency changer comprising an armature member having slip-rings and a commutator, said armature having N commutating zones per pole-pair, where N is greater than two, and a stator member having polyphase windings carrying slip-frequency currents of predetermined phase, magnitude and phase-sequence and producing predetermined flux components of a plurality of pole numbers which are multiples of the fundamental pole number of the armature member and of such phase, magnitude and direction of rotation as to combine vectorially with the fundamental armature flux in the commutating zones to produce proper commutating conditions at said commutating zones.

5. A frequency changer comprising an armature member having slip-rings and a commutator, a stator member, and means including polyphase stator windings for producing predetermined flux magnetomotive forces of a plurality of pole numbers which are multiples of the fundamental pole number of the armature member and which are of such phase, magnitude and phase rotation as to overcome the armature field at the commutating zones.

6. A frequency changer comprising an armature member having slip-rings and a commutator, said armature having N commutating zones per pole-pair, where N is greater than two, and means including stator windings for producing a backwardly rotating harmonic field of the N−1 order and a substantially equal forwardly rotating harmonic field of the N+1 order, said harmonic fields being of such strength as to overcome the armature field at the commutating zones.

7. A frequency changer comprising an armature member having slip-rings and a commutator, said armature having N commutating zones per pole-pair, where N is greater than two, and means including stator windings for producing a backwardly rotating harmonic field of the N−1 order, a substantially equal forwardly rotating harmonic field of the N+1 order and a forwardly rotating fundamental field, said harmonic fields being of such strength and phase-relationship as to reverse the fundamental field at the commutating zones.

8. A frequency changer comprising an armature member having slip-rings and a commutator, said armature having N commutating zones per pole-pair, where N is greater than two, and means including stator windings for producing a backwardly rotating harmonic field of the N−1 order and a substantially equal forwardly rotating harmonic field of the N+1 order, said harmonic fields being of such strength as to reverse the armature field at the commutating zones, said reverse commutating field being of such strength as to develop, in the coils undergoing commutation, a voltage produced by rotation which is substantially equal and opposite to the spark-producing voltages produced from other causes in the commutating coils.

9. A frequency changer comprising an X-pole armature member having slip-rings and a commutator cylinder, brushes bearing upon said commutator cylinder, a stator member carrying windings having pole numbers which are multiples of X, and means for exciting said windings from said brushes.

10. A frequency changer comprising an X-pole armature member having slip-rings and a commutator cylinder, said armature having N commutating zones per pole-pair, where N is greater than two, brushes bearing upon said commutator cylinder, a stator member carrying an (N−1) X pole winding and an (N+1) X pole winding, means for exciting said (N−1) X pole winding from said brushes in the reverse phase sequence and means for exciting said (N+1) X pole winding from said brushes in the forward phase sequence.

11. A frequency changer comprising an X-pole armature member having slip-rings and a commutator cylinder, said armature having N commutating zones per pole-pair, where N is greater than two, brushes bearing upon said commutator cylinder, a stator member carrying an (N−1) X pole winding and an (N+1) X pole winding, means for exciting said (N−1) X pole winding from said brushes in the reverse phase sequence, means for exciting said (N+1) X pole winding from said brushes in the forward phase sequence and means for adjusting the excitation of said windings.

12. A frequency changer comprising an X-pole armature member having slip-rings and a commutator cylinder, said armature having N commutating zones per pole-pair, where N is greater than two, brushes bearing upon said commutator cylinder, a stator member carrying an X-pole winding, an (N−1) X pole winding and an (N+1) X pole winding, and means for exciting said windings from said brushes.

13. A frequency changer comprising a three-phase 120°-pitch armature member having slip-rings and a commutator, and a stator member carrying windings producing a backwardly rotating second-harmonic field and a forwardly rotating fourth-harmonic field.

14. A frequency changer comprising a three-phase 120°-pitch X-pole armature member having slip rings and a commutator cylinder, brushes bearing upon said commutator cylinder, a stator member carrying an X-pole winding, a 2X pole winding and a 4X pole winding, and means for exciting said windings from said brushes.

15. A polyphase commutating machine having an armature member provided with a commutator cylinder, brushes bearing on said cylinder and a plurality of field windings of different pole-numbers energized from said brushes.

16. A polyphase commutating machine having an armature member provided with a commutator cylinder, brushes bearing on said cylinder, said armature member having N commutating zones per pole-pair, and a stator member carrying windings producing a backwardly rotating harmonic field of the N−1 order and a forwardly rotating harmonic field of the N+1 order.

17. A frequency changer comprising an armature member having slip-rings and a commutator, and means including a stator member for producing such harmonics in the field as to reverse the armature field at the commutating zones, said reverse commutating field being of such strength as to develop a rotational commutating voltage which is substantially equal and opposite to the spark-producing voltages produced from other causes in the commutating coils.

18. A polyphase commutating machine having means including stator windings for producing such rotating harmonics in the field as to overcome the armature field at the commutating zones.

19. A polyphase commutating machine having means including stator windings for producing such harmonics in the field as to reverse the armature field at the commutating zones.

20. A polyphase commutating machine having means including a stator member for producing such harmonics in the field as to reverse the armature field at the commutating zones, said reverse commutating field being of such strength as to develop a rotational commutating voltage which is substantially equal and opposite to the spark-producing voltages produced from other causes in the commutating coils.

21. A polyphase commutator-type dynamo-electric machine having an X-pole commutated armature winding, a plurality of exciting field windings having pole-numbers which are exact multiples of X, and means for simultaneously energizing said field windings during the normal operation of the machine.

22. A polyphase alternating-curent machine having a plurality of exciting field windings of multiple pole-numbers, and means for simultaneously energizing said windings during the normal operation of the machine in order to produce harmonic fields.

23. A frequency-changer having an armature winding provided with slip-rings and a commutator cylinder, and means for producing rotating field flux magnetomotive forces of a plurality of pole numbers which are multiples of the fundamental pole number of the armature winding and of such phase, magnitude and direction of rotation as to reverse the field at the commutating zones.

In testimony whereof, I have hereunto subscribed my name this 15th day of April 1922.

RUDOLF E. HELLMUND.